United States Patent
Hanna et al.

(10) Patent No.: US 6,981,069 B2
(45) Date of Patent: Dec. 27, 2005

(54) COMPRESSED DATA TRANSMISSION OVER A PLURALITY OF TRANSMISSION PATHS

(75) Inventors: Stephen D. Hanna, Longmont, CO (US); Howard C. Jackson, Loveland, CO (US)

(73) Assignee: International Business Machines Corp., Armonk, NY (US)

( * ) Notice: Subject to any disclaimer, the term of this patent is extended or adjusted under 35 U.S.C. 154(b) by 223 days.

(21) Appl. No.: 09/891,032

(22) Filed: Jun. 25, 2001

(65) Prior Publication Data

US 2002/0196461 A1    Dec. 26, 2002

(51) Int. Cl.[7] .............................................. G06F 3/00
(52) U.S. Cl. ............................ 710/5; 710/20; 710/33; 710/52
(58) Field of Search ........................... 710/8, 20, 5, 33, 710/52

(56) References Cited

U.S. PATENT DOCUMENTS

| | | | |
|---|---|---|---|
| 4,498,079 A | 2/1985 | Ghosh et al. | 340/725 |
| 4,799,186 A | 1/1989 | Ployette | 364/900 |
| 5,461,679 A | 10/1995 | Normile et al. | 382/304 |
| 5,600,799 A | 2/1997 | Young et al. | 395/280 |
| 5,646,651 A | 7/1997 | Spannaus et al. | 345/185 |
| 5,696,983 A | 12/1997 | Watanabe et al. | 395/800 |
| 5,798,762 A * | 8/1998 | Sfarti et al. | 345/420 |
| 5,926,292 A * | 7/1999 | Ishikawa et al. | 358/534 |
| 6,009,242 A * | 12/1999 | Anzai | 358/1.15 |
| 6,049,390 A * | 4/2000 | Notredame et al. | 358/1.15 |
| 6,310,563 B1 * | 10/2001 | Har et al. | 341/50 |
| 6,412,022 B1 * | 6/2002 | Kumpf et al. | 710/1 |
| 6,507,347 B1 * | 1/2003 | van de Ven | 345/619 |
| 6,538,762 B1 * | 3/2003 | Terashima et al. | 358/1.15 |

FOREIGN PATENT DOCUMENTS

JP    05030366 A  *  2/1993  ............ H04N 1/41

OTHER PUBLICATIONS

"Concurrent PostScript Rasterizers Based High Throughput Color Printer Architecture", IBM Technical Disclosure Bulletin, vol. 40 No. 03, Mar. 1997, pp. 141-150.
"Apparatus for High Throughput Protocols in High-Performance Computer Systems", IBM Technical Disclosure Bulletin, vol. 38 No. 08, Aug. 1995, pp. 195.

* cited by examiner

*Primary Examiner*—Kim Huynh
*Assistant Examiner*—Eron J. Sorrell
(74) *Attorney, Agent, or Firm*—Kunzler & Associates (57) ABSTRACT

A method and apparatus for data transmission transmits both compressed and noncompressed data over each of a plurality of transmission paths. A data identification pattern is used to request a type of data from a memory having a plurality of data types stored within it. A handshaking control module is provided to select the correct type of data from the memory and place it on the output of the memory. The requested data type is then transmitted to a data decompression module via an interface. The data transmission can occur on any one of a plurality of data transmission paths when the data being transmitted is either Linework or Linework control data. When the data decompression module receives the data, it is then routed to any one of a plurality of data decompression systems based upon the results of the evaluation of the data identification pattern. The routing of the received data is wholly dependent upon the data identification pattern and independent of which transmission path the data was received on.

28 Claims, 6 Drawing Sheets

COMPRESSED DATA TRANSMISSION OVER A PLURALITY OF TRANSMISSION PATHS

BACKGROUND OF THE INVENTION

1. The Field of the Invention

This invention relates to the field of raster based graphic generation and, more specifically, to the transmission of data from a random access memory associated with raster object data to a raster object data processing module.

2. The Relevant Art

Raster Image Processors generally consist of hardware and software that converts vector graphics into raster (bit-mapped) images. These processors are used in page printers, phototypesetters, and electrostatic plotters. Raster image processing can be of considerable duration, especially when large images are being printed.

In the current state of the art, printer systems receive compressed data of some format from a host over a system bus, such as a PCI bus. The compressed data is stored in memory that resides on a circuit board between the host and the printer itself. Once the data has been received into memory, it is sent to a decompressor and from the decompressor, to the printer. The path from the host to the printer is known as a data pipeline.

When large print operations, or jobs, are sent through the data pipeline for printing, the delay in processing and printing the data can be substantial. This delay can be caused by a number of factors such as decompression schemes, data bottlenecks, printer speed and memory speed. Data bottlenecks occur when data is sitting idle in the pipeline waiting to be transmitted to the next stage in the pipeline. While the data is idle, precious processing time is being wasted.

Often, in current art printing systems, different data types are assigned specific buses upon which they may be transmitted. For instance, a typical print job may contain JPEG image data, Linework image data, and Linework control data, with each data type being transmitted over its own, individual bus to the correct processor. Often, when one data type dominates a print job, the bus for that data type operates at 90–100 percent capacity, while the other two buses in the system run at perhaps 10% capacity. Due to the large amount of data being transmitted on a single bus, the data type that is transmitted on that bus begins to stack up in the pipeline and causes a data bottleneck. The bottleneck, in turn, slows down the operation of the printer or other raster image processing device.

From the above discussion, it can be seen that it would be beneficial to improve the performance of printing systems by providing a system and method for data transmission that is capable of utilizing all the available bus space in a print system to transmit print data more quickly to a high capacity print engine.

OBJECTS AND BRIEF SUMMARY OF THE INVENTION

The data transmission system of the present invention has been developed in response to the present state of the art, and in particular, in response to the problems and needs in the art that have not yet been fully solved by currently available data transmission systems. Accordingly, it is an overall object of the present invention to provide a data transmission system that overcomes many or all of the above-discussed shortcomings in the art.

To achieve the foregoing object, and in accordance with the invention as embodied and broadly described herein in the preferred embodiment, an improved data decompression system and method are provided.

The data transmission method of the present invention may include receiving a plurality of parallel data streams of compressed print data each having a plurality of bytes into a storage stage such as a memory or FIFO. The memory or FIFO is fed in groups of bytes as space opens up. The data waits in the memory or FIFO until a request for the data is received from the decompression system.

When the memory receives the data request, it transmits the appropriate type of data to be decompressed. The requested data is then transmitted over one of a plurality of available buses between the memory system and the appropriate decompressor within the decompression system.

When the request for data is generated, an identification pattern for the data type being requested is also generated and transmitted simultaneously with the data request.

The data identification pattern within the request is evaluated by the memory and the appropriate data type is then transmitted over any one of a plurality of buses located between the memory system and the decompression system, depending upon availability of the buses. When the data is transmitted from the memory system to the decompression system, the identification pattern is transmitted immediately preceding the data. When the data identification pattern is transmitted by the decompression system, the memory or FIFO evaluates the pattern and routes the data following the pattern to the appropriate decompression system. The data is then decompressed in an appropriate manner, and is transmitted to other downstream elements of the printing system.

These and other objects, features, and advantages of the present invention will become more fully apparent from the following description and appended claims, or may be learned by the practice of the invention as set forth hereinafter.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENTS

Figure 1:
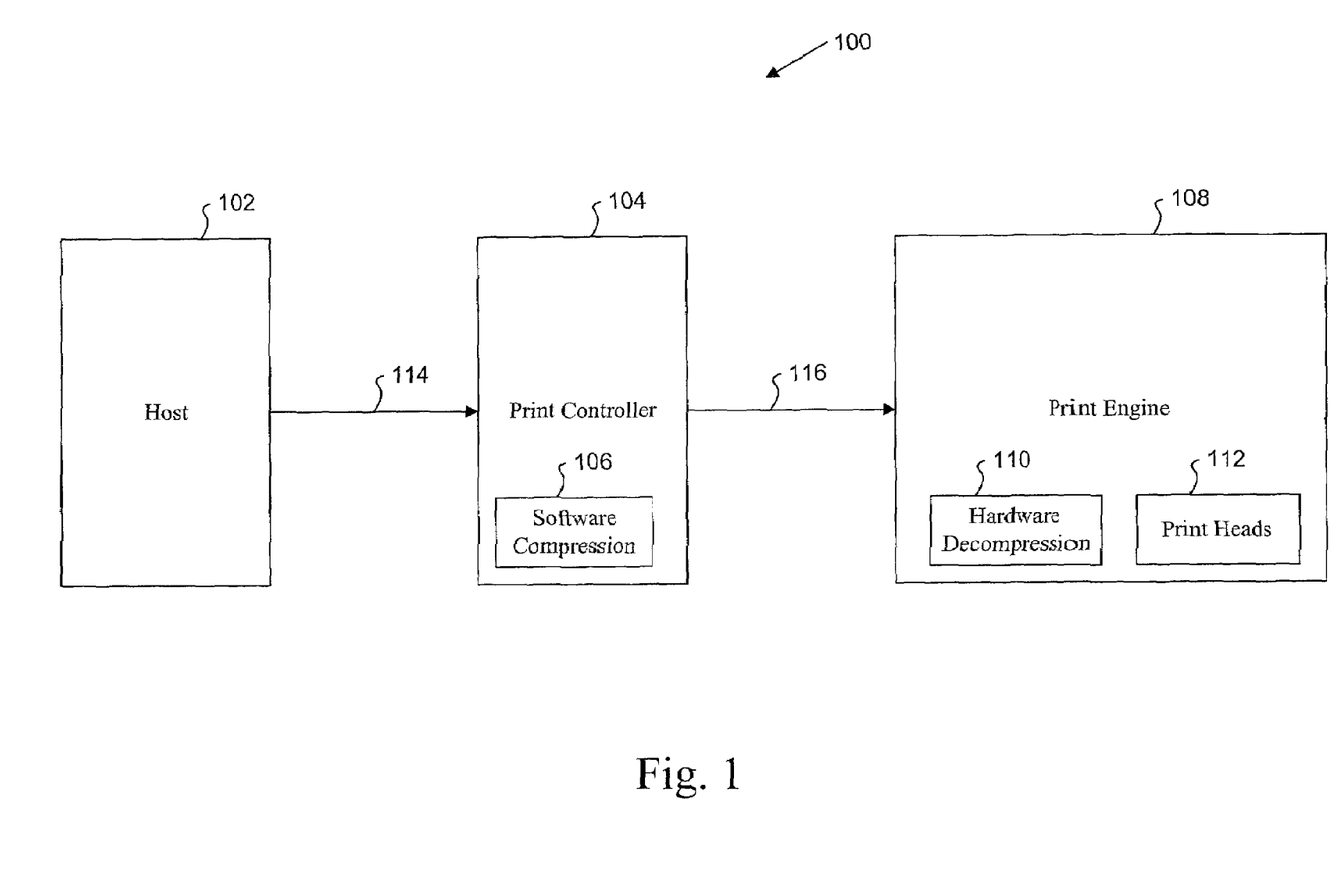
FIG. 1 is a schematic block diagram illustrating one embodiment of a printer system that uses data transmission techniques for the transmission of compressed print data.

FIG. 1 illustrates one embodiment of a data printing system suitable for implementing the present invention. The data printing system 100 includes a host 102, a print controller 104, and a print engine 108. The data printing system 100 is configured to transmit data from the host 102 to be printed by the print engine 108. The host 102 may be any type of computer system, including for example, a laptop computer, a desktop computer, a workstation, a server, and a mainframe. Data and control signals transmitted by the host 102 are coupled to the print controller 104 on interfaces 114 and 116, respectively. A software compression module 106 compresses images received into the print controller 104 from the host 102. The images are preferably rasterized before being compressed. Some images may come previously compressed.

The print controller 104 generally contains microcode to construct an image to be printed by the print engine 108. The print image is digitally formed in the page memory of the print controller 104 in a format required by the print engine 108 to generate an image. In one embodiment of the present invention, the print controller 104 is a reduced instruction set (RISC) microprocessor. In other embodiments the print controller 104 may have other types of architectures such as, for example, a complex instruction set (CISC) architecture. Print controllers are well known in the art, and consequently, it is not necessary to provide a detailed description of the internal components and operation of the print controller 104.

In one embodiment, the print engine 108 is a four color (CYMK) LED printer that functions to generate a visible image from digital data residing in the page memory of the print controller 104. In a further embodiment, the print engine 108 is a multiple beam color laser printer.

Printer systems such as the printer system 100 shown in FIG. 1 are generally configured to conduct a series of hardware and software operations on digital print data in preparation for printing. These hardware and software operations are often referred to as a pipeline. The digital print data is used by the print engine 108 to form a print image on a printing surface. An area of the print surface on which the image is formed is referred to as a picture element (PEL or pixel). One scan of the LEDs across the print surface forms a row of pixels referred to as a scan row. The print image is formed by multiple scan rows being successively formed on the print surface.

Often, the image is further broken up into objects, with a plurality of objects per page. The types of data passing through the pipeline generally include text, graphics, images and combinations of these elements. The density of dot placement in modem printers is constantly increasing, particularly with color printing that requires additional bits per PEL over monochrome printing. The time required for the data pipeline to transmit the data from the host computer 102 to the print engine 108 is correspondingly increasing. To fully utilize the increasing speed capabilities of print engines, the pipeline of a printer system must be able to transfer data fast enough to supply a continuous stream of data to the print engine 108 in order to allow the print engine 108 to print data continuously.

The depicted embodiment of a printer system 100 utilizes software compression 106 and hardware decompression 110 to compress and decompress print data in such a manner that it may be transferred to the print engine 108 as a high volume, continuous data stream. Data compression refers to a process that attempts to convert data in a given format into an alternative format or formats requiring less space and bandwidth than the original. One example of a data compression format is JPEG. By using data compression and decompression in printer systems such as the printer system 100, it is possible to transmit data quickly enough to keep the print engine 108 printing data continuously.

One further compression technique, referred to as run length encoding, converts a data stream of continuous pixel data into a code for transmission. In so doing, repeated identical bytes of the data stream frequently occur and can be passed in compressed code. For example, using one run length compression method, the pixel data line "aaaabbbbbbbccccccdd" is converted into the coded data "a4b7c5d2." The coded data consists of bytes of pixel information (a, b, c and d) and the number of those bytes that are the same (4, 7, 5 and 1). Each byte contains 8 bits of pixel information.

Once the print data is rasterized and compressed in the print controller 104, the print data is transmitted to the print engine 108. In the depicted embodiment, the print data is transported across a PCI bus interface. Upon arriving at the print engine 108, the print data is decompressed using the hardware decompression 110. When the data has been successfully decompressed, it is transferred to the print heads 112 for printing.

Figure 2:
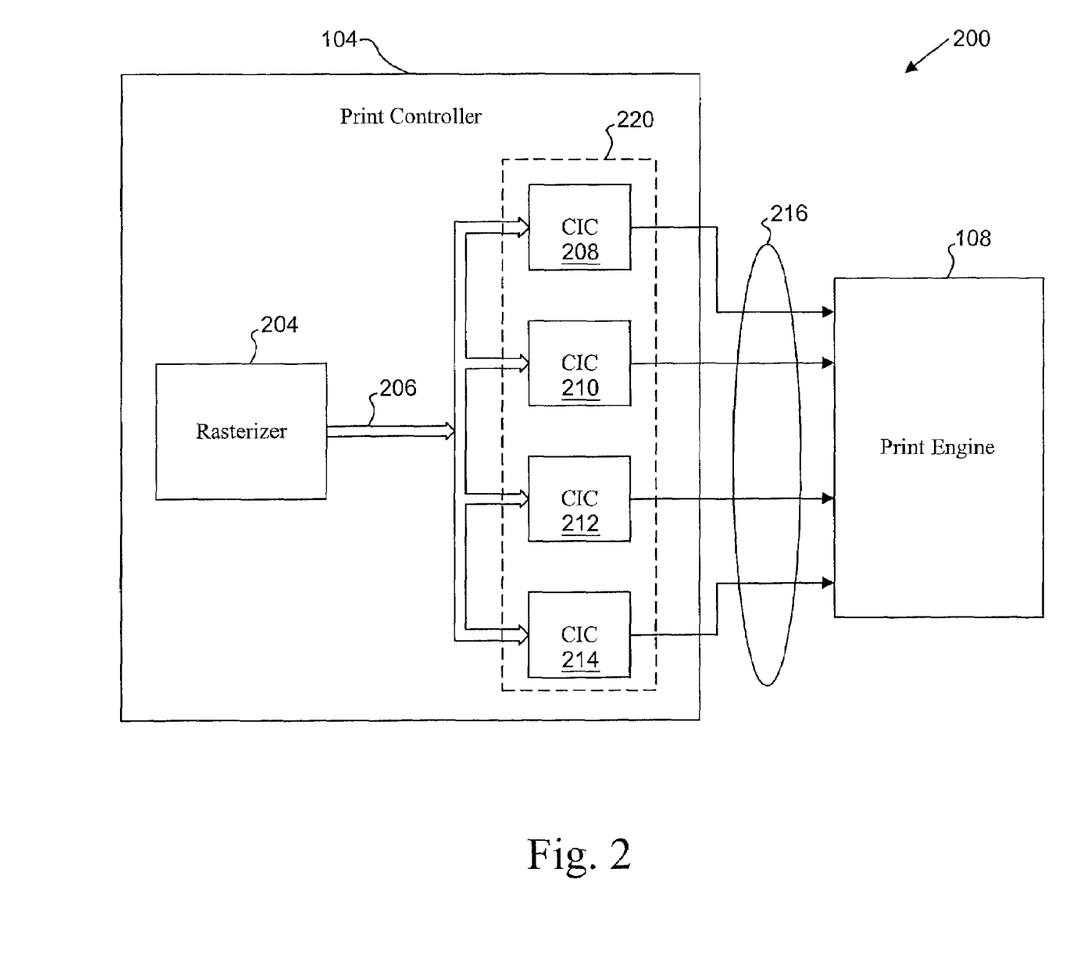
FIG. 2 is a schematic block diagram that illustrates one embodiment of a color printing system.

FIG. 2 illustrates one embodiment of a printing system 200 suitable for incorporating the data transmission system and method of the present invention. In one embodiment, the printing system 200 includes a print controller 104, a plurality of color interface cards (CIC) 208, 210, 212, 214 (collectively 220), and a print engine 108. The print controller 104 may include a rasterizer 204. The rasterizer 204 preferably makes a raster image of print data, then compresses the print data or part thereof as objects, and transmits the compressed print data to the CICs 220 via a bus 206 such as a PCI bus. In one embodiment, at least a portion of the print data is compressed using run length encoding (RLE), and the decompression thereof is substantially lossless. The print data is also transmitted in other compressed formats such as JPEG that do not decompress losslessly.

In one embodiment, the rasterizer 204 processes an input stream of print data that describes what is to be printed by the print engine 108. The rasterizer 204 converts input print data into bitmaps that are in a format that is compatible with the hardware of the CIC cards 220. The print data may be organized into a plurality of objects of text and/or images on a print sheet originally stored in the print controller 104. The print data is then compressed so that it may be stored and later transmitted to the CICs 220 over an interface such as the PCI bus interface using a minimum of bandwidth.

The output of the rasterizer 204 allows the CICs 220 to render the objects in the compressed data stream by driving the output devices, such as a print head 112 of FIG. 1 containing lasers or LEDs. In an alternative embodiment, the method described herein may be used in other output devices of data networks to losslessly compress/decompress objects and render the objects on a screen, for instance, by driving output devices such as LCD arrays within a computer monitor.

In one embodiment, each CIC 220 can decompress any or all of three data types: Continuous Tone (CT), Linework (LW), or Linework control (LWC). The CICs 220 assigned to decompress LW and LWC data perform a lossless decompression of the compressed stream of LW and LWC data, while the CICs 220 assigned to decompress the CT data may perform a lossy decompression of the compressed stream of CT print data. The decompressed data is then transmitted via print head signals 216 to feed the print heads 112 of FIG. 1. The print head signals 216 preferably transmit various types of decompressed data from the CICs 220. For example, continuous tone (CT) data, linework (LW) data and linework control (LWC) data are transmitted as bit maps through the print head signals 216. When the print engine 108 receives a print head signal 216, the signal may contain any or all of the three data types merged together.

In one embodiment, a plurality of CICs 220 are multiplexed at the print engine 108 to provide a high capacity print engine with a constant flow of decompressed print data. In the depicted embodiment, four CICs 220 decompress print data in parallel. The CICs 220 are preferably located together in a modular bus interface card, such as a RISC card, local to the print engine 220.

In the preferred embodiment, two colors are supported per CIC card 220. Thus, for example, in a printer printing four colors in duplex, four CIC cards are required.

Figure 3:
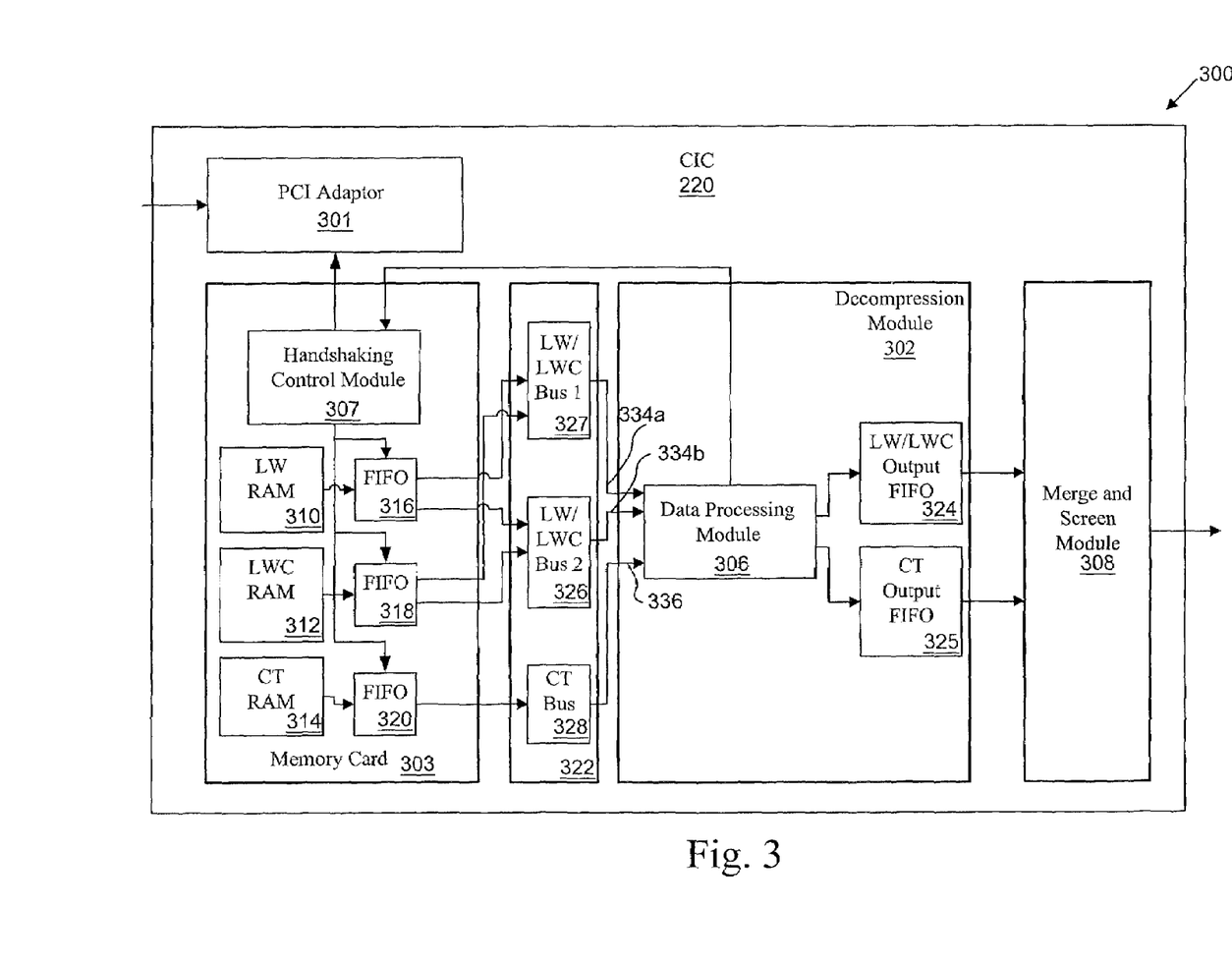
FIG. 3 is a schematic block diagram illustrating one embodiment of a color interface card.

FIG. 3 is a schematic block diagram illustrating one embodiment of a data transmission and processing system 300 of the present invention. In the depicted embodiment, the data transmission and processing system 300 comprises a color interface card (CIC) 220 of FIG. 2. The CIC 220 includes a PCI adapter 301, a memory card 303, an interface 322, a decompression module 302 and a merge and screen module 308. The PCI adaptor 301 is preferably configured to receive data streams of compressed print data using the PCI interface and to pass those data streams into the memory card 303. A handshaking control module 307 is preferably provided to request the data from the PCI adaptor 301 as the decompression module 302 needs it.

As depicted, the memory card 303 (given herein as one example of a memory stage) comprises a plurality of RAM memory modules 310, 312, 314 and a plurality of FIFO buffers 316, 318, 320. The data streams received by the PCI adaptor 301 are passed into one of the RAM modules 310, 312, 314 depending on the type of print data in the particular data stream. In the depicted embodiment, print data compressed using run length encoding (e.g., LW data) is transferred in to the RAM module 310, while control data (e.g., LWC data) for that print data is passed to the RAM module 312. Print data compressed using a continuous tone format such as JPEG is transferred to the RAM module 314. The respective print data is then passed in to the respective FIFO buffers 316, 318, and 320. Once the data has been passed to the FIFO buffers, it awaits a data request from the data processing module 306 via the handshaking control module 307.

When a data request has been received from the data processing module 306, the handshaking control module 307 makes the data type corresponding to the data request available at the output of the appropriate FIFO buffer. The data requested is then transmitted to the data processing module 306 of the decompression module 302 via the interface 322. The interface 322 is preferably configured with a plurality of internal buses, including one that is dedicated to the transmission of CT data and two that may used to transmit either LW or LWC data. The data processing module 306 receives the data via the transmission paths 334a, 334b for LW and LWC data and via the transmission path 336 for CT data. The data processing module 306 then decompresses the requested data and transmits it through the output FIFOs 324 and 325 to the merge and screen module 308.

For example, when the data processing module 306 requests Linework (LW) data, the handshaking control module 307 requests the data from the host and stores it in the LW RAM memory 310. The data is then transferred to the LW FIFO 316 when the FIFO 316 has space to admit the data. The handshaking control module 307 then enables the output of the FIFO 316 and places the data on either the LW/LWC bus 327 or the LW/LWC bus 326 depending upon which bus the data was requested across by the data processing module 306. If neither bus is busy, the data processing module 306 adheres to a set or random procedure to determine which bus the data is transmitted across. The data is then transmitted via the selected bus to the data processing module 306, which then decompresses the data.

The merge and screen module 308 then merges the decompressed print data, screens the print data, and subsequently transmits the print data to the print engine 108 of FIG. 1. The decompressed print data is then fed into the print heads 112. In one embodiment, a plurality (eight in the depicted embodiment) of concurrently decompressed print data streams are transmitted to the print engine 108 at once, preferably through a plurality (e.g., two) of fiber channel interfaces.

In one preferred embodiment, each CIC 220 comprises a plurality of decompression modules identical to the depicted decompression module 302. In one embodiment, each CIC 220 contains two such modules 302. Each CIC 220 also preferably comprises a corresponding plurality of merge and screen modules identical to the depicted merge and screen module 308. The existence of a plurality of decompression modules and merge and screen modules per each CIC 220 allows each CIC 220 to decompress a plurality of incoming data streams simultaneously in a parallel fashion.

While in the depicted embodiment only a single linework decompressor 356 and a single linework control decompressor 358 are shown, the data processing module 306 is in one embodiment comprised of four linework decompressors 356 with four associated FIFOs 350, and four linework control decompressors 358 with four associated FIFOs 352. Thus up to four linework decompressors and four linework control decompressors may simultaneously request data across the two buses 334a and 334b. The data processing module 306 coordinates those requests and passes up to two requests on to the memory card 303, one request per bus.

Figure 4:
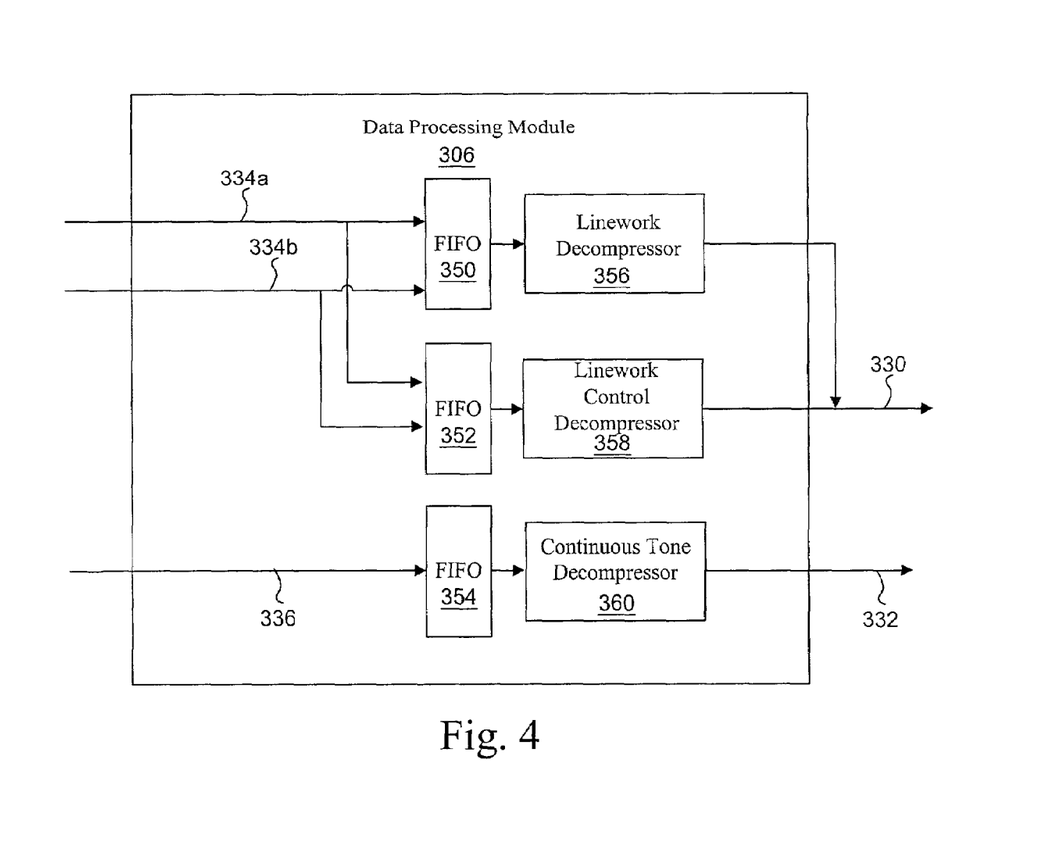
FIG. 4 is a schematic block diagram illustrating one embodiment of a data processing module of the present invention.

FIG. 4 illustrates one embodiment of a data processing module 306 configured to receive and process the data requested from the memory card 303 of FIG. 3 through the handshaking control module 307 of FIG. 3. The data processing module 306 comprises a set of input FIFO buffers 350, 352, 354 a Linework decompressor 356, a Linework control decompressor 358, and a continuous tone decompressor 360. When the data processing module 306 requests the compressed data from the memory card 303 of FIG. 3, the handshaking control module 307 enables the output of the appropriate FIFO 316, 318, or 320.

Once the appropriate FIFO 316, 318, or 320 has been enabled, the handshaking control module 307 determines which bus to place the data on. If the data is Linework or Linework Control data, it may be placed on either of the LW/LWC buses 326 and 327, according to which bus the data processing module 306 requested the data to be transmitted across. The data processing module 306 controls which bus 326, 327 the data is transmitted across. If both LW/LWC buses 326 and 327 are not busy, the data processing module 306 arbitrarily chooses one of the LW/LWC buses 326 and 327 to use. Of course, a standard procedure such as an alternating scheme could also be used to select which of the buses 326, 327 to place the data on when both buses are not busy. The LW/LWC data is then transmitted to the data processing module 306 via the transmission paths 334a or 334b.

Continuous Tone data is always transmitted via the CT bus 328. Accordingly, when CT data is requested, the CT data is transmitted to the data processing module 306 via the CT bus 328 and the transmission path 336.

If the data being received comprises Linework data, the data is routed through the FIFO buffer 350 into the Linework decompressor 356. The Linework decompressor 356 decompresses the compressed print data and transmits it to the output FIFO 324 of FIG. 3 via transmission line 330. Likewise, if the data being received comprises Linework control data, the compressed data is routed through FIFO buffer 352 into the Linework control decompressor 358. The Linework control data is then decompressed and transmitted to the output FIFO 324 of FIG. 3 via the transmission path 330. If the data received is continuous tone data, such as a JPEG compressed image, the compressed data is routed through the FIFO 354 into the continuous tone decompressor 360. The continuous tone decompressor 360 then decompresses the data and transmits it to the output FIFO 325 of FIG. 3 via the transmission path 332.

The use of the output FIFO buffers 324, 325 of FIG. 3 allows the data from the Linework decompressor 356, the Linework control decompressor 358 and the continuous tone decompressor 360 to be simultaneously loaded into the merge and screen module 308 of FIG. 3. This merge and screen operation allows one area of an image to contain multiple data types. Each may be compressed, transmitted and decompressed separately, but may be printed simultaneously through the use of the output FIFO buffers 324, 325 of FIG. 3 and the merge and screen module 308 of FIG. 3.

The invention preferably also utilizes two bus request lines, one for bus 326 and one for bus 327 to communicate which linework or linework control objects are needed. A bit on each bus is used to designate whether the requested objects are linework or linework control data.

The present invention provides advantages over the prior art. These advantages result from the fact that the memory components within the memory card 303 of FIG. 3 are capable of operating at a rate twice as fast as the decompressors 356, 358, 360 of FIG. 4. In addition, typical print jobs tend to involve either large amounts of linework (LW) data and small amounts of linework control (LWC) data or vice-versa, but generally not equal amounts of both types of data.

In prior art printers, a data processing module (such as the data processing module 306) might request an object X of LW data (for example) from the handshake control module 307. Even though the LWC decompressor and corresponding interface circuitry is capable of simultaneously requesting and receiving LWC data, this would not occur under the prior art because the job consisted primarily of LW data. Therefore, the memory would sit and wait for the LW decompressor and interface circuitry to process the current data and request additional data, while the LWC decompressor sat idle. A similar situation existed for jobs that consisted primarily of LWC data. In such jobs, the LW decompressor sat idle for large amounts of time.

Under the present invention, the data processing module 306 may now request and receive a plurality of objects of the same type simultaneously. For example, the data processing module 306 may request an object X of LW data and an object Y of LW data more or less simultaneously from the handshake control module 307. The object Y request would in one example under embodiments of the present invention specify the LWC bus 326. The memory system 303 would then start extracting data from the LW memory 310 and steer the object X data to the LW bus 327 and the object Y data to the LWC bus 326. The data would therefore be delivered to the decompressors 350 and 352 at twice the rate as the prior art implementation.

Figure 5:
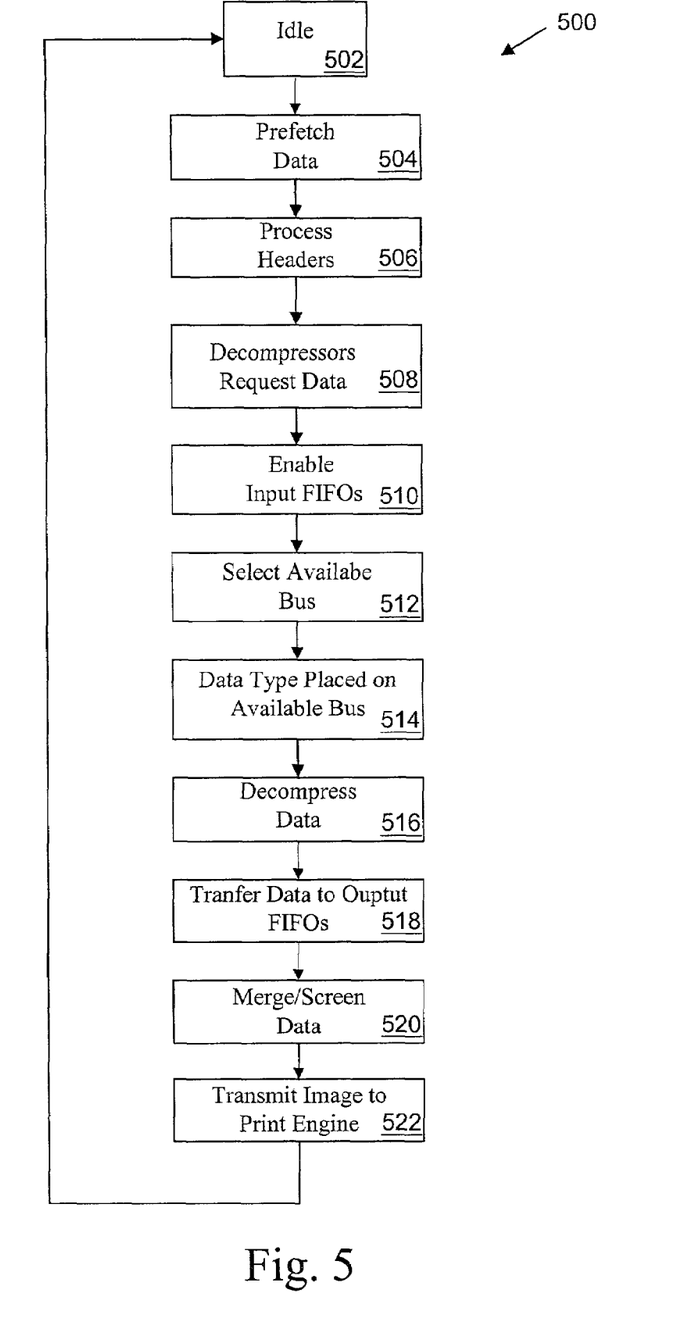
FIG. 5 is a schematic flow chart diagram illustrating one embodiment of a data transmission method for use with the present invention.

FIG. 5 is a schematic flow chart diagram illustrating one embodiment of a process 500 that may be conducted by the CIC 220 of FIG. 3 to transmit a plurality of data types over any one of a plurality of available data buses. In the depicted embodiment, the process 500 is in an idle state 502 when printing jobs are not being processed. When the host 102 of FIG. 1 initializes a printing job, the CIC 220 of FIG. 3 prefetches the data associated with that print job into the memory 303 of FIG. 3 in a step 504. While the data is being prefetched into the memory 303, the CIC 220 processes the header information of the data to be printed in a step 506. The processing of the headers in the step 506 allows the decompressor 356, 358, and 360 within the data processing module 306 to know the correct manner in which to request the data for decompression from the memory 303. Once the data has been prefetched into the memory 303 in the step 504 and the headers have been processed in the step 506, the data processing module 306 begins to request data to be decompressed in a step 508.

Each request that the data processing module 306 makes is preferably for a specific data type, either Linework (LW), Linework Control (LWC), or continuous tone (CT). The handshaking control module 307 is configured to evaluate the data type requested by the data processing module 306 and enable the appropriate input FIFO 316, 318, and 320 in a step 510. Once the appropriate input FIFO 316, 318, and 320 has been enabled in the step 510, the handshaking control module 307 selects the bus to place the data on in a step 512. If the data requested is CT data, the data is always placed upon the dedicated CT bus 328 in a step 514. However, if either LW or LWC data is requested, either one the LW/LWC buses 326 and 327 may be used to transmit the data. The data processing module 306 evaluates how busy each of the LW/LWC buses 326 and 327 are and requests the data to be transmitted across the least busy bus 326 and 327 in the step 514.

Once the data has been placed upon the appropriate bus in the step 514, it is then transmitted to the data processing module 306 and decompressed by the appropriate decompressor 356, 358, and 360 in a step 516. Once the data has been decompressed in the step 516, it is transmitted to the output FIFOs 324 and 325 in a step 518. The data is held in the output FIFOs 324 and 325 until all the data for an object has been decompressed and then the data is transmitted to the merge and screen module 308. When the data arrives at the merge and screen module 308, the different types of decompressed data (LW, LWC, and CT) are merged together in a step 520. Once the data has been merged together, it is transmitted to the print engine 108 in a step 522.

Figure 6:
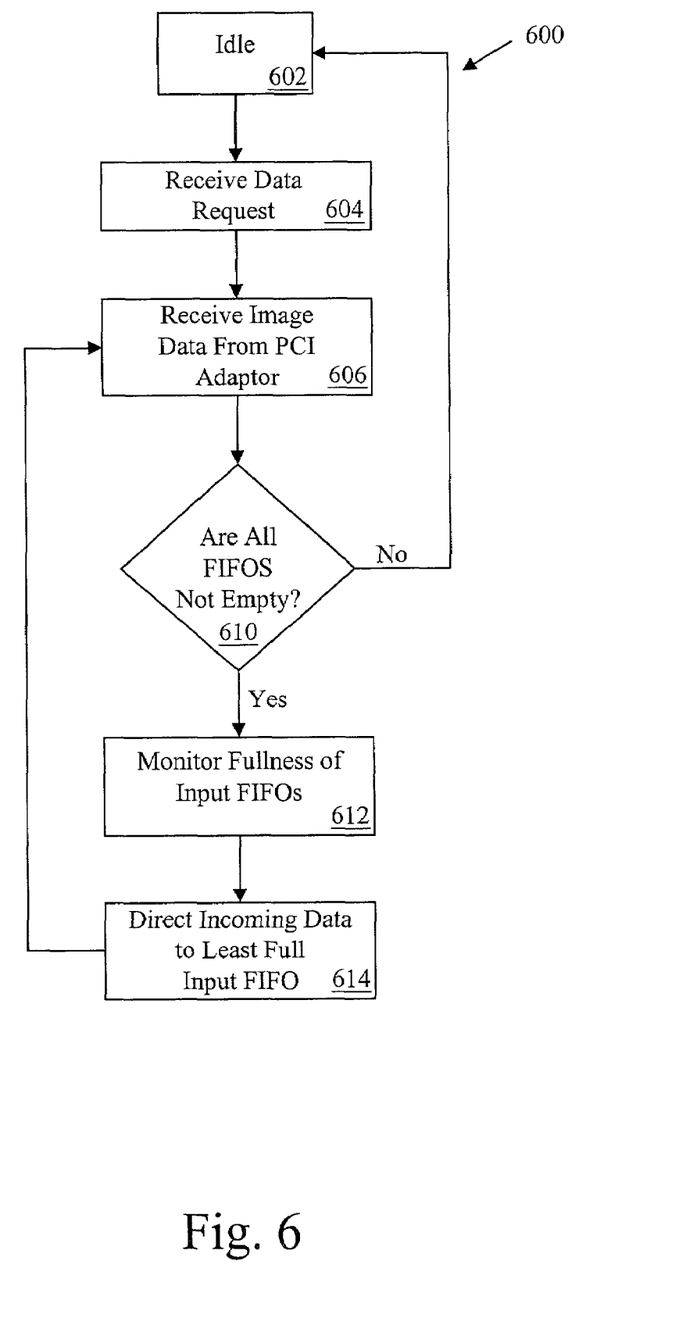
FIG. 6 is a schematic flow chart diagram illustrating one embodiment of a handshaking routine for use with the present invention.

Throughout the cycle of the data transmission process 500, the handshaking control module 307 monitors the input data stream and input FIFOs 316, 318, and 320 as outlined in the process 600 of FIG. 6. When no print jobs are being processed, the handshaking control module 307 is in an idle state as shown in a step 602. When a print job is begun, the data processing module 306 sends a request to the handshaking control module 307 for data based upon the evaluation of the file headers as shown as part of the process 500. The handshaking control module 307 receives the request in a step 604 and requests the image data from the host 102 through the PCI adaptor 301 in a step 606.

As the data requested from the PCI adaptor 301 in the step 606 is being received, the handshaking control module 307 places the data into the correct input FIFO 316, 318, and 320. For example if the data processing module 306 requested Linework data, the handshaking control module 307 would place the Linework data into the FIFO 316 associated with Linework data. As the data stream comes into the CIC 220 from the host 102, the handshaing control module continuously checks to verify that all of the input FIFOs 316, 318, and 320 are not empty in a step 610. Once any one of the input FIFOs 316, 318 or 320 becomes empty, the printing process comes to a halt and the handshaking control module 307 returns to an idle state of the step 602.

If, however, all of the input FIFOs 316, 318, and 320 are not empty, as determined in the step 610, the handshaking control module 307 monitors the fullness of each individual FIFO 316, 318, and 320 in a step 612. When data is received from the PCI adaptor 301 in the step 606 it is directed to the FIFO 316, 318, and 320 that has the least amount of data in the step 614. This process 600 ensures that all of the FIFOs 316, 318, 320 remain full until the end of the print process.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A method for transmitting a plurality of data types over a plurality of transmission paths, comprising:
   storing data of a plurality of data types, including linework (LW) data and linework control (LWC) data;
   receiving a request for at least one of said types of stored data;
   transmitting at least one of the linework (LW) data and the linework control (LWC) data over a shared transmission path; and
   processing the transmitted data in accordance with the data type of the transmitted data after the transmission of the data.

2. The method of claim 1, wherein storing the data further comprises placing the data in one of a plurality of First-In First-Out (FIFO) buffers.

3. The method of claim 1, further comprising requesting at least one of the said types of stored data requesting the by introducing an identification pattern into a transmission request, the identification pattern indicating the data type of the data requested.

4. The method of claim 3, wherein transmitting the at least one of the linework (LW) data and linework control (LWC) data the data further comprises transmitting the data identification pattern associated with the data type being transmitted at the same time as the data being transmitted.

5. The method of claim 1, wherein transmitting the at least one of the linework (LW) data and linework control (LWC) data further comprises transmitting the linework (LW) data over a linework control (LWC) transmission path.

6. The method of claim 1, wherein transmitting the at least one of the linework (LW) data and linework control (LWC) data further comprises transmitting the linework control (LWC) data over a linework (LW) transmission path.

7. The method of claim 1, wherein transmitting the data further comprises trnsmitting continuous tone (CT) data over a continuous tone (CT) trnsmission path.

8. The method of claim 1, wherein processing the transmitted data further comprises reading a word of the data into a data decompression module every one half clock cycle.

9. The method of claim 8, wherein processing the transmitted data further comprises multiplexing the different types of data and processing each type of data received in accordance with the data type.

10. The method of claim 9, wherein processing the transmitted data further comprises losslessly decompressing the data when the data received is the linework (LW) data.

11. The method of claim 9, wherein processing the transmitted data further comprises losslessly decompressing the data when the data received is the linework control (LWC) data.

12. The method of claim 9, wherein processing the transmitted data further comprises decompressing the data when the data received is continuous tone (CT) data.

13. A method for transmitting a plurality of data types over a plurality of transmission paths comprising:
   storing data of a plurality of data types, including linework (LW) data and linework control (LWC) data, in a plurality of First-In First-Out (FIFO) buffers;
   requesting at least one of said types of stored data by introducing an identification pattern into a transmission request, the identification pattern indicating the data type of the data being requested;
   transmitting the identification pattern associated with the data type being transmitted at the same time as the data being transmitted;
   transmitting a distinct stream of linework (LW) data over any one of a plurality of shared transmission paths;
   transmitting a distinct stream of the linework control (LWC) data over any one of the plurality of shared transmission paths;
   transmitting a distinct stream of continuous tone (CT) data over a distinct transmission path; and
   processing the transmitted data in accordance with the data type of the data after the transmission of the data, the processing further comprising:
      reading a word of the data into a decompression module every one-half clock cycle;
      multiplexing the different types of data and processing each type of data received in accordance with the data type;
      losslessly decompressing the data when the data received is the linework (LW) data;
      losslessly decompressing the data when the data received is the linework control (LWC) data; and
      decompressing the data when the data received is the continuous tone (CT) data.

14. A system for transmitting a plurality of data types over a plurality of transmission paths comprising:
   a memory module configured to store a plurality of data types, including linework (LW) data and linework control (LWC) data;
   a handshaking control module configured to control transmission of the linework (LW) data and the linework control (LWC) data over a shared transmission bus; and
   a data processing module configured to receive and process the transmitted data in accordance with the data type of the transmitted data.

15. The system of claim 14, wherein the memory module further comprises a plurality of First-In First-Out (FIFO) buffers.

16. The system of claim 14, wherein the handshaking control module is further configured to receive data from a host and place the received data into the memory module.

17. The system of claim 16, wherein the handshaking module is further configured to place the received data into one of the plurality of FIFO buffers depending upon the data type of the data received.

18. The system of claim 14, wherein handshaking control module is further configured to receive requests for print data from the data processing module.

19. The system of claim 18, wherein the handshaking control module is further configured to place the requested data on a data bus appropriate for the data type requested.

20. The system of claim 19, wherein the handshaking control module is further configured to place continuous tone (CT) data on a dedicated continuous tone (CT) bus.

21. The system of claim 19, wherein the shared transmission bus comprises one of a plurality of shared transmission buses and the handshaking control module is further configured to place the linework (LW) data on a least busy of the plurality of shared transmission buses.

22. The system of claim 19, wherein the shared transmission bus comprises one of a plurality of shared transmission buses and the handshaking control module is further configured to place the linework control (LWC) data on a least busy of the plurality of shared transmission buses.

23. The system of claim 14, wherein the data processing module is further configured to evaluate header information relating to a print job to determine what types of data to request from the handshaking control module.

24. The system of claim 23, wherein the data processing module is further configured to read one word of the received data into a decompression module every one-half clock cycle.

25. The system of claim 24, wherein the data processing module is further configured to process each type of data received in accordance with the data type.

26. The system of claim 25, wherein the decompression module is configured to losslessly decompress the linework (LW) data.

27. The system of claim 25, wherein the decompression module is configured to losslessly decompress the linework control (LWC) data.

28. The system of claim 25, wherein the data processing module is further configured to decompress continuous tone (CT) data.

* * * * *

UNITED STATES PATENT AND TRADEMARK OFFICE
CERTIFICATE OF CORRECTION

PATENT NO. : 6,981,069 B2
APPLICATION NO. : 09/891032
DATED : December 27, 2005
INVENTOR(S) : Stephen D. Hanna et al.

It is certified that error appears in the above-identified patent and that said Letters Patent is hereby corrected as shown below:

Column 9,
Line 41, "data requesting the by" should read -- data by --.

Signed and Sealed this

Eleventh Day of March, 2008

JON W. DUDAS
*Director of the United States Patent and Trademark Office*